(12) United States Patent
Lee

(10) Patent No.: US 8,129,952 B2
(45) Date of Patent: Mar. 6, 2012

(54) BATTERY SYSTEMS AND OPERATIONAL METHODS

(75) Inventor: Erik Lee, Austin, TX (US)

(73) Assignee: Valence Technology, Inc., Las Vegas, NV (US)

(*) Notice: Subject to any disclaimer, the term of this patent is extended or adjusted under 35 U.S.C. 154(b) by 464 days.

(21) Appl. No.: 12/425,321

(22) Filed: Apr. 16, 2009

(65) Prior Publication Data

US 2010/0264740 A1  Oct. 21, 2010

(51) Int. Cl.
*H02J 7/04* (2006.01)
*H02J 7/00* (2006.01)
*H02J 1/00* (2006.01)

(52) U.S. Cl. ........ 320/140; 320/118; 320/119; 320/121; 320/117; 307/80; 307/82

(58) Field of Classification Search .......... 320/140, 320/118, 119, 121
See application file for complete search history.

(56) References Cited

U.S. PATENT DOCUMENTS

| | | | |
|---|---|---|---|
| 5,631,534 A | | 5/1997 | Lewis |
| 6,031,355 A | * | 2/2000 | Rich ............................ 320/117 |
| 6,329,792 B1 | * | 12/2001 | Dunn et al. ................... 320/132 |
| 6,377,024 B1 | * | 4/2002 | Choy ............................ 320/118 |
| 6,639,383 B2 | * | 10/2003 | Nelson et al. ................. 320/116 |
| 7,193,392 B2 | * | 3/2007 | King et al. .................... 320/118 |
| 7,282,814 B2 | * | 10/2007 | Jacobs ........................... 307/82 |
| 2010/0109608 A1 | * | 5/2010 | Buono et al. .................. 320/121 |

OTHER PUBLICATIONS

"A Review of Cell Equalization Methods for Lithium Ion and Lithium Polymer Battery Systems"; Moore et al.; Society of Automotive Engineers, Inc.; 2001; 5 pp.

* cited by examiner

*Primary Examiner* — M'Baye Diao
(74) *Attorney, Agent, or Firm* — Brian T. Mangum; Roger A. Williams; Cynthia S. Kovacevic

(57) ABSTRACT

This disclosure includes battery systems and operational methods. According to one aspect, a battery system includes conversion circuitry, a plurality of main terminals configured to be coupled with a load, a charger and a plurality of rechargeable battery modules which are coupled in series with one another intermediate the main terminals, switching circuitry configured to couple a first of the battery modules with an input of the conversion circuitry, and the conversion circuitry being configured to modify an electrical characteristic of electrical energy received from the first of the battery modules and to output the electrical energy having the modified characteristic to a second of the battery modules.

43 Claims, 4 Drawing Sheets

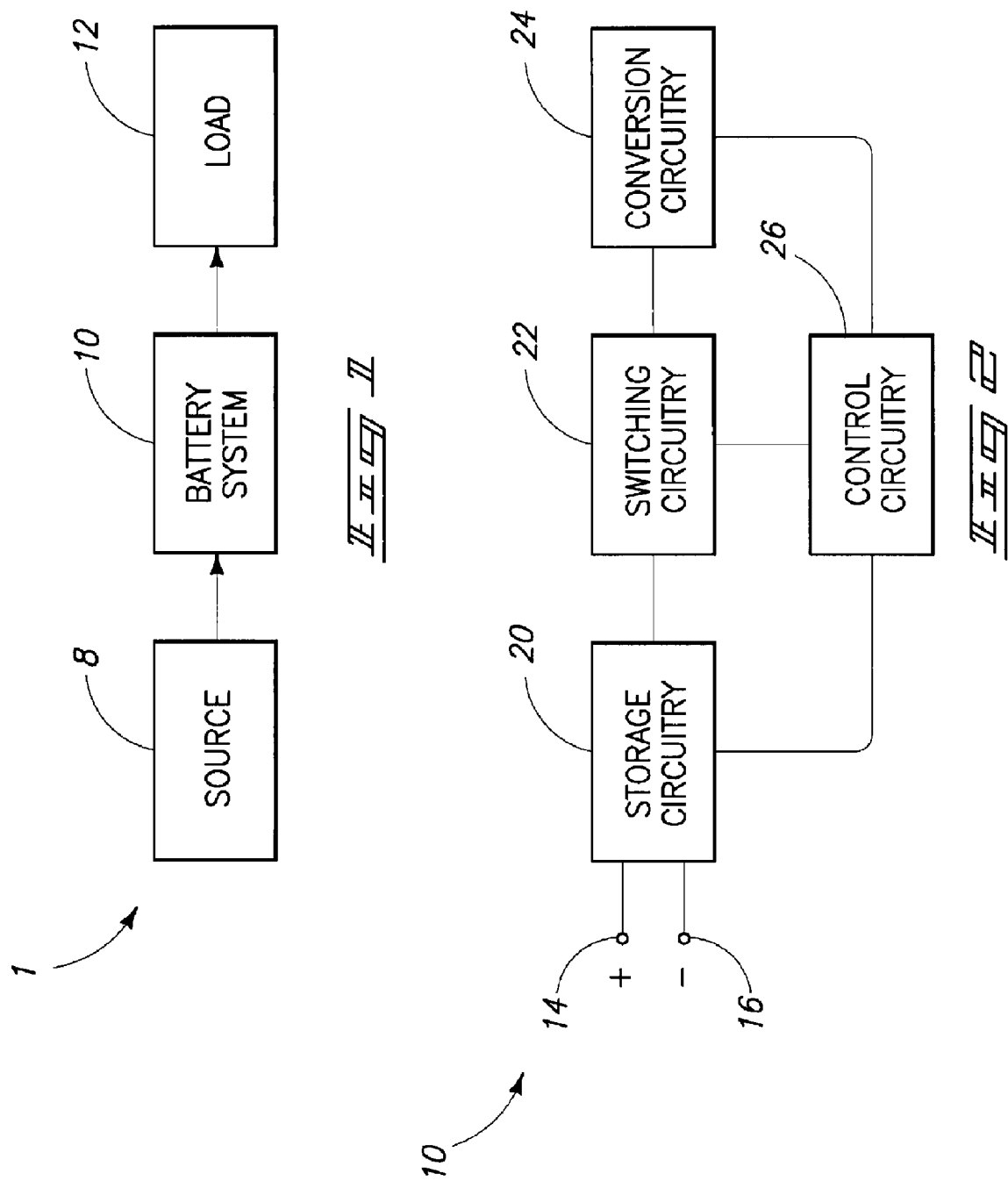

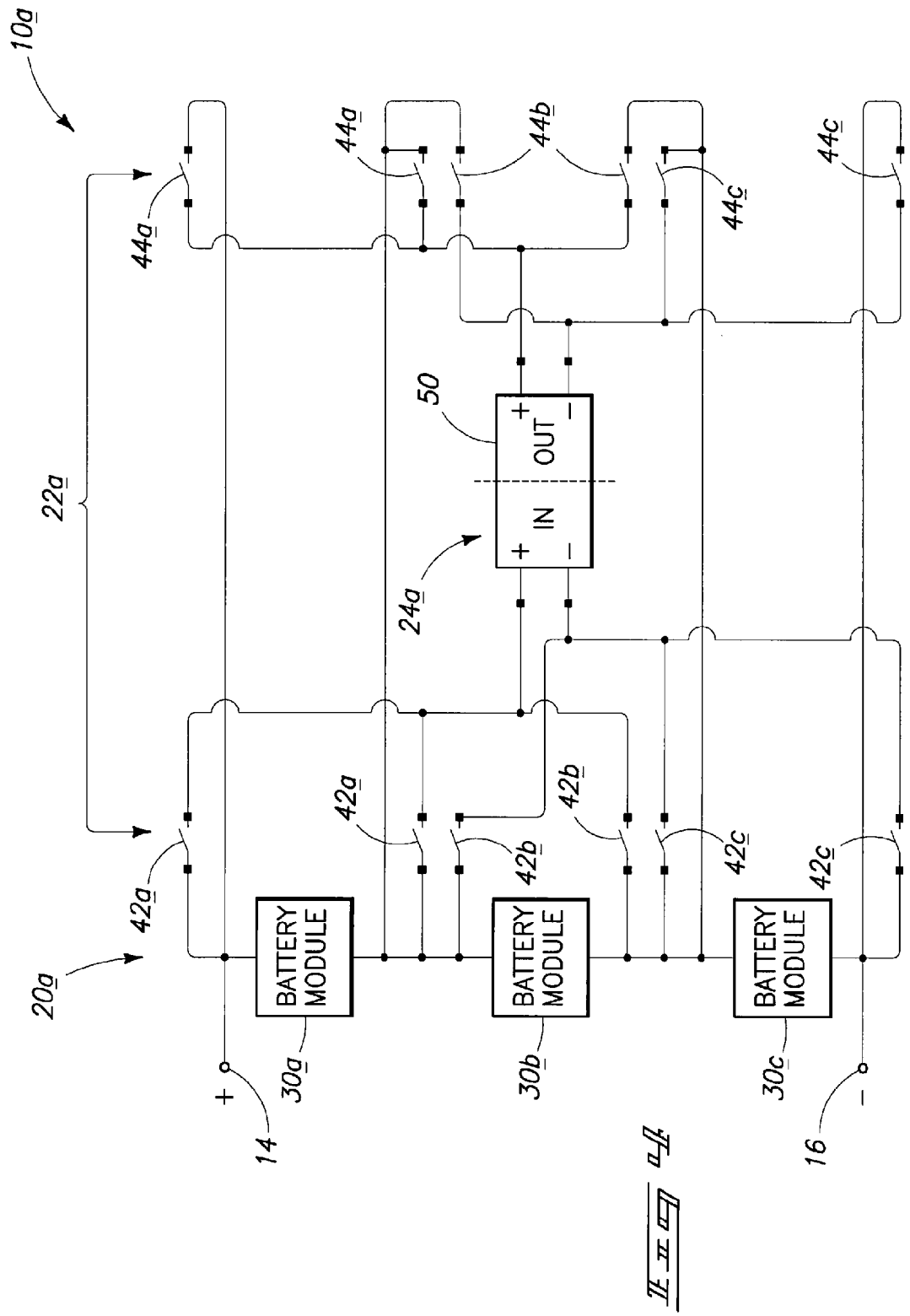

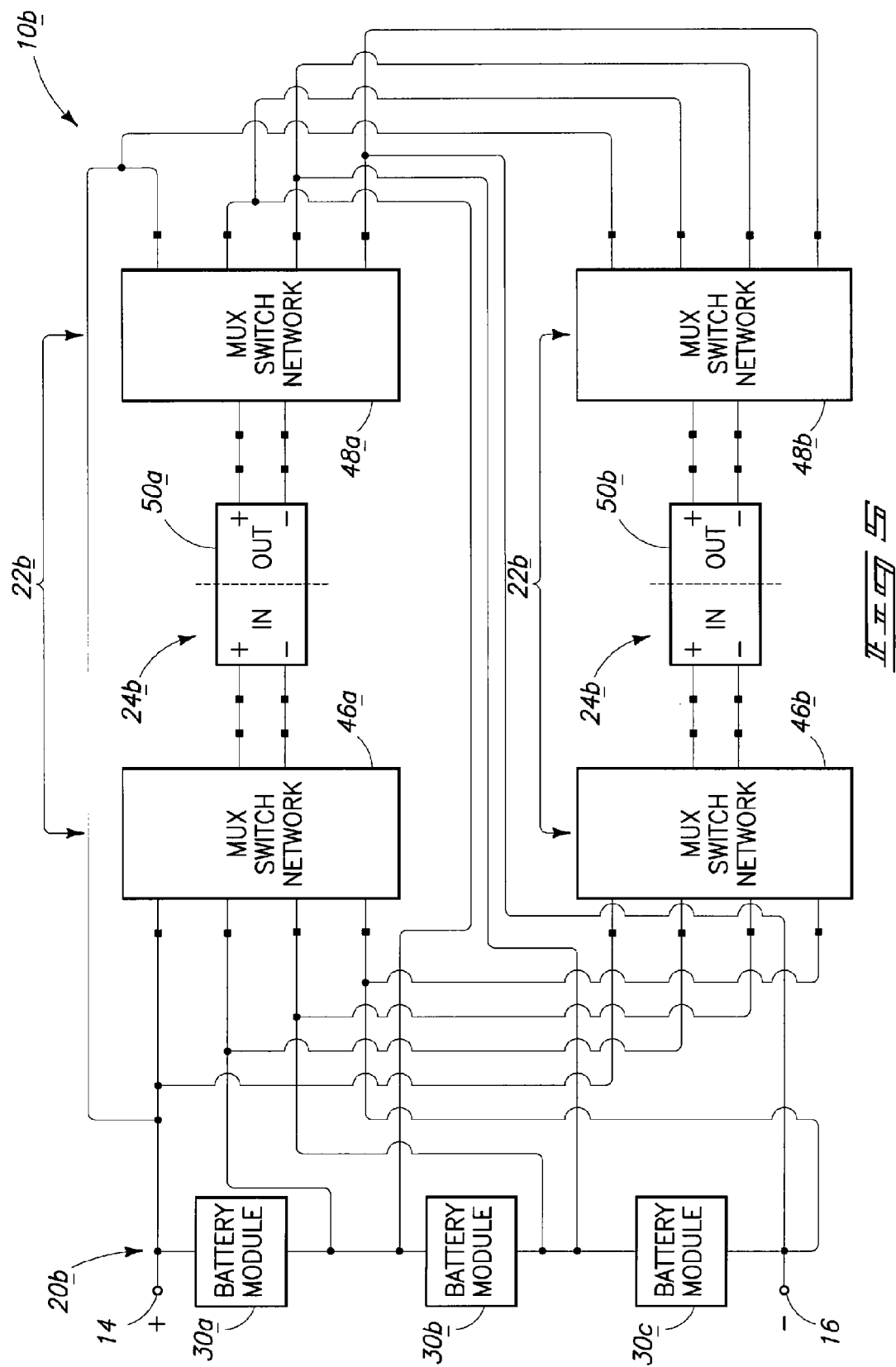

BATTERY SYSTEMS AND OPERATIONAL METHODS

TECHNICAL FIELD

This disclosure relates to battery systems and operational methods.

BACKGROUND OF THE DISCLOSURE

Rechargeable batteries are being designed for and used in varied applications with different requirements for electrical energy. Some rechargeable battery systems comprise plural rechargeable cells which receive electrical energy during charging operations and supply electrical energy to a load during discharging operations. Rechargeable cells may have different chemistries and may include Lithium Ion cells in one example. The number of rechargeable cells used in different applications is varied depending upon the requirements of the load, and the number of cells may be numerous in some implementations, for example, transportation implementations.

Individual ones of the rechargeable cells may vary from others of the rechargeable cells, for example, due to manufacturing processes and tolerances. More specifically, one or more of the rechargeable cells may have different internal resistances, impedances, etc. coupled with others of the rechargeable cells of a battery. Accordingly, during charging and/or discharging operations of the battery, one or more of the cells may operate differently than others of the rechargeable cells. For example, one or more of the cells may charge or discharge at a rate different than others of the rechargeable cells. This may be undesirable in some applications.

BRIEF DESCRIPTION OF THE DRAWINGS

Exemplary embodiments of the disclosure are described below with reference to the following accompanying drawings.

FIG. 1 is a functional block diagram of an electrical system according to one embodiment.

FIG. 2 is a functional block diagram of a battery system according to one embodiment.

FIG. 4 is a schematic representation of a battery system according to one embodiment.

FIG. 5 is a schematic representation of a battery system according to one embodiment.

DETAILED DESCRIPTION OF THE DISCLOSURE

Figure 3:
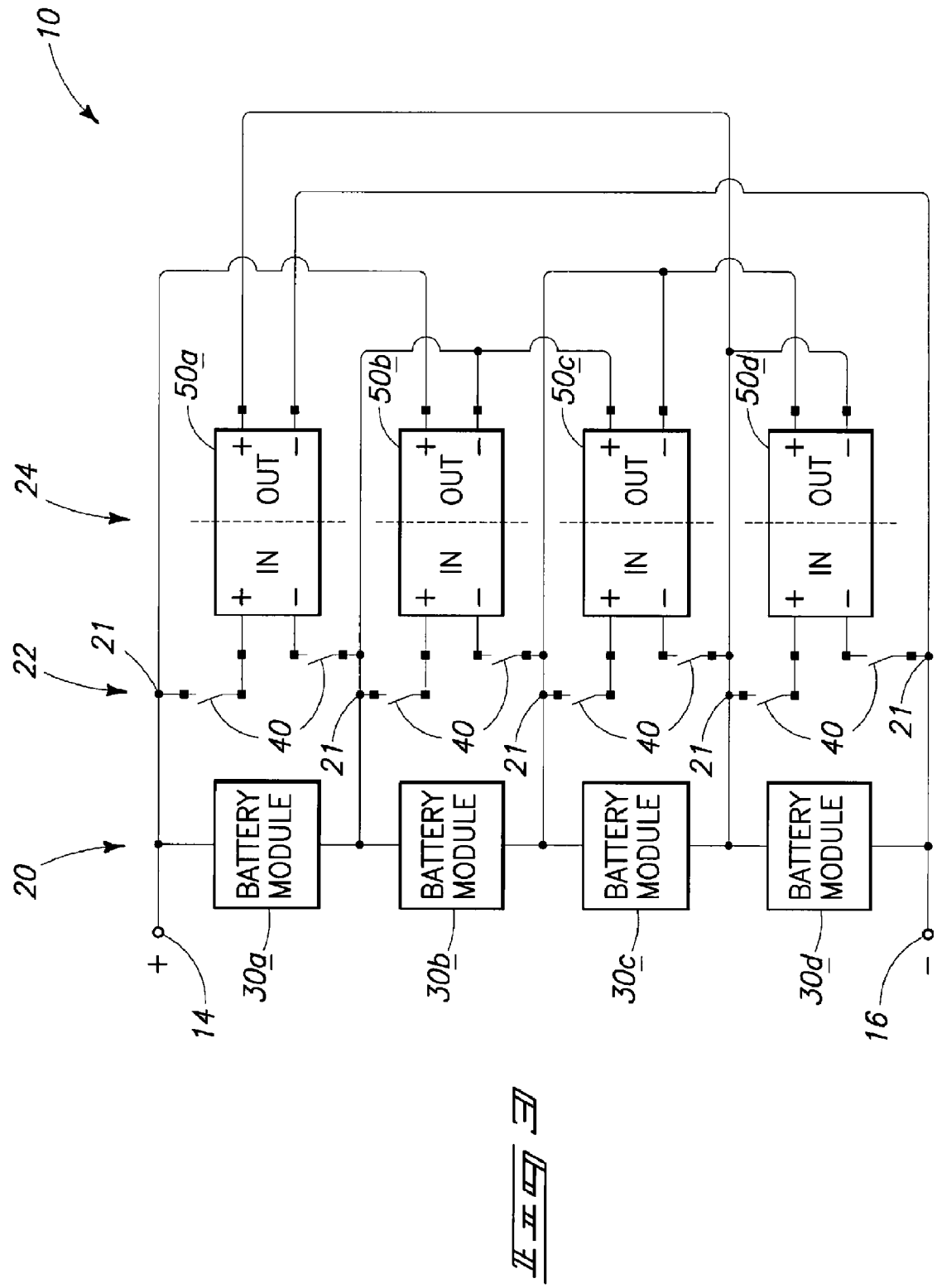
FIG. 3 is a schematic representation of a battery system according to one embodiment.

According to one embodiment, a battery system comprises conversion circuitry, a plurality of main terminals configured to be coupled with a load, a charger and a plurality of rechargeable battery modules which are coupled in series with one another intermediate the main terminals, switching circuitry configured to couple a first of the battery modules with an input of the conversion circuitry, and the conversion circuitry being configured to modify an electrical characteristic of electrical energy received from the first of the battery modules and to output the electrical energy having the modified characteristic to a second of the battery modules.

According to another embodiment, a battery system comprises a plurality of rechargeable battery modules coupled in series between a plurality of main terminals configured to be coupled with a load and a charger, and balance circuitry configured to receive electrical energy from a first of the rechargeable battery modules, to modify the electrical energy, and to provide the modified electrical energy from the first of the rechargeable battery modules to a second of the rechargeable battery modules to at least one of decrease the state of charge of the first of the battery modules and increase the state of charge of the second of the battery modules.

According to an additional embodiment, a rechargeable battery system operational method comprises charging a plurality of rechargeable battery modules of a rechargeable battery coupled in series with one another, discharging electrical energy from the battery modules to a load, selecting a first of the battery modules, as a result of the selecting, modifying an electrical characteristic from electrical energy of the first of the battery modules, and after the modifying, applying the modified electrical energy to a second of the battery modules to at least one of decrease the state of charge of the first of the battery modules and to increase the state of charge of the second of the battery modules.

According to yet another embodiment, a rechargeable battery system operational method comprises monitoring states of charge of a plurality of rechargeable battery modules coupled with one another in series, detecting a first of the battery modules having a state of charge which is lower than a state of charge of a second of the battery modules, modifying electrical energy from the second of the battery modules, and after the modifying, applying the electrical energy from the second of the battery modules to the first of the battery modules to at least one of increase the state of charge of the first of the battery modules and decrease the state of charge of the second of the battery modules.

Referring to FIG. 1, an example of an electrical system 1 is shown according to one embodiment. The depicted electrical system 1 includes a source 8, battery system 10, and a load 12. In the described embodiment, battery system 10 is a rechargeable battery system configured to operate in a charge mode of operation where electrical energy from source 8 charges one or more of a plurality of rechargeable cells of battery system 10. Furthermore, battery system 10 may operate in a discharge mode of operation where the battery system 10 discharges electrical energy to load 12. The battery system 10 may be subjected to numerous charge and discharge cycles during operation in one embodiment.

Battery system 10 may include a plurality of rechargeable cells (not shown in FIG. 1) arranged either in series and/or parallel configurations appropriate to power load 12. More specifically, battery system 10 may be used in different applications with different configurations of load 12 having different power requirements. Accordingly, battery system 10 may include different numbers of rechargeable cells arranged in different series and/or parallel arrangements appropriate for different loads 12 in different embodiments.

However, one or more of the rechargeable cells may vary from others of the rechargeable cells, for example, due to manufacturing tolerances. In particular, one or more of the rechargeable cells may have different electrical characteristics (e.g., impedances) compared with the others of the rechargeable cells. Due to the variances, the one or more of the rechargeable cells may charge and/or discharge at different rates compared with others of the rechargeable cells during operation of the battery system 10. At least some aspects of the disclosure are directed towards increasing and/or maintaining equalization or balance of charge of the rechargeable cells of the battery system 10 during charge and/or discharge operations.

Referring to FIG. 2, one embodiment of battery system 10 is shown. Battery system 10 includes a plurality of main terminals 14, 16, rechargeable electrical energy storage circuitry 20, switching circuitry 22, and conversion circuitry 24 in the depicted embodiment. Other embodiments of battery system 10 are possible including more, less and/or alternative components.

Although not shown in FIG. 2, a charger and load may be coupled with main terminals 14, 16. The source 8 and load 12 may be coupled with main terminals 14, 16 at different moments in time or simultaneously. The source 8 operates as a charger to charge the battery system 10 which may thereafter discharge stored electrical energy to the load 12. Main terminals 14, 16 are terminals at different voltage levels and may include positive and negative main terminals in one embodiment.

In some arrangements, the depicted circuitry 20, 22, 24, 26 may be provided within a common housing. In other embodiments, it may be desirable to use the switching circuitry 22, conversion circuitry 24 and control circuitry 26 with different storage circuits 20 (e.g., batteries) at different moments in time. For example, storage circuitry 20 in the form of a rechargeable battery may have a fixed useful life and be replaceable (e.g., have a fixed number of charge and discharge cycles), and accordingly, circuitry 22, 24, 26 may be associated with different storage circuits 20 at different times over the life of use of the battery system 10.

Storage circuitry 20 may include one or more rechargeable battery cells in one embodiment. Charging electrical energy provided by source 8 may be received by main terminals 14, 16 to charge the storage circuitry 20. Furthermore, electrical energy stored in the storage circuitry 20 may also be provided to load 12 via main terminals 14, 16 during discharge operations of battery system 10. In one embodiment, the rechargeable cells may be Lithium Ion cells having an operational (e.g., fully-charged) voltage of approximately 3.65 Volts.

As described below, the storage circuitry 20 may include a plurality of battery modules which may individually include one or more of the rechargeable cells. The rechargeable cells may be arranged in different configurations in different arrangements of battery system 10, for example, depending upon the requirements of the load 12. In addition, the battery modules of a given battery system 10 typically have the same arrangement of rechargeable cells although different battery modules of a given battery system 10 may also have different arrangements of rechargeable cells in at least one embodiment. In one example embodiment, the battery modules may individually have a 4s10p arrangement where four banks of rechargeable cells are arranged in series between positive and negative terminals (not shown) of the battery module while each bank includes ten cells coupled in parallel. Other arrangements of storage circuitry 20 are possible, including an embodiment where individual battery modules of the storage circuitry 20 only include a single rechargeable cell.

During operation of storage circuitry 20 (e.g., charging or discharging), the battery modules typically have substantially the same state of charge which may be referred to as a nominal state of charge. However, the states of charge of one or more of the battery modules may vary from the nominal state of charge (e.g., be greater than or less than the nominal state of charge by an amount in excess of a threshold, such as 1% in one embodiment), for example, due to manufacturing tolerances of rechargeable cells of the battery modules. A battery module may be considered to be balanced with other battery modules (i.e., the nominal state of charge) if its respective state of charge is less than the threshold with respect to the nominal state of charge in one embodiment.

Example embodiments described herein are configured to perform operations to increase the balance of the states of charge of the battery modules compared with arrangements where the operations are not performed. In one more specific embodiment, operations are performed to provide the battery modules with substantially the same nominal state of charge during charge or discharge operations of the battery system 1. Switching circuitry 22, conversion circuitry 24 and control circuitry 26 may be referred to as balance circuitry configured to implement balancing operations with respect to different battery modules.

Switching circuitry 22 is configured to couple the storage circuitry 20 with the conversion circuitry 24 in the described embodiment. Switching circuitry 22 includes a plurality of switches (not shown in FIG. 2) coupled intermediate the storage circuitry 20 and conversion circuitry 24 in one embodiment. Switching circuitry 22 may include transistors, relays, multiplexes and/or other switching devices. In one embodiment, conversion circuitry 24 has one or more inputs and outputs and switching circuitry 22 is configured to selectively couple one or more of the battery modules of the storage circuitry 20 with the inputs and the outputs of the conversion circuitry 24. As described below according to one embodiment, switching circuitry 22 may couple different ones of the battery modules of the storage circuitry 20 with the inputs and the outputs of the conversion circuitry 24 at different moments in time.

Conversion circuitry 24 is configured to modify an electrical characteristic of electrical energy received at an input of the conversion circuitry 24 and to output the modified electrical energy. Different configurations of conversion circuitry 24 may be used in different embodiments. The conversion circuitry 24 discussed below according to illustrative embodiments includes one or more DC-to-DC converters individually configured to modify the electrical characteristic comprising voltage of the electrical energy received by the conversion circuitry 24. The conversion circuitry 24 implemented as DC-to-DC converter(s) is configured to receive electrical energy having a voltage which may be within a range (e.g., 2.5 V to 4.5 V) and to output modified electrical energy having a substantially constant voltage. In one embodiment, the conversion circuitry 24 is configured to output the modified electrical energy having a voltage corresponding to a voltage of an individual one of the rechargeable cells in a fully charged state (e.g., 3.65 V). In another embodiment, the output voltage may be adjustable.

In one example, the converters are implemented as isolated DC-to-DC converters where the input and output of an individual one of the given converters do not share a common reference (e.g., ground) coupled with the negative terminals of the input and output of the converter. Usage of isolated DC-to-DC converters in one embodiment provides increased flexibility with respect to selecting which battery modules may be coupled with the inputs and outputs of the converters compared with non-isolated arrangements which share a common reference. In one example, different ones of the available battery modules may be used to supply electrical energy to increase the state of charge of a battery module having a state of charge below the nominal state of charge regardless of whether the available battery modules have a common reference voltage with the battery module having the reduced state of charge. In the described embodiment, an isolated DC-to-DC converter arrangement permits the selection of any of the available battery modules having sufficient charge to supply the electrical energy to the input of the converter for use in charging the battery module having the lower state of charge. Furthermore, some DC-to-DC converter arrangements may include control inputs which permit control circuitry 26 to disable the converters for protection during faults or other possible damaging conditions. Other configurations of conversion circuitry and/or converters may be used in other embodiments.

As described below in illustrative examples, the conversion circuitry 24 includes one or more inputs and outputs. The selected battery module having the different state of charge (e.g., lower state of charge than the nominal state of charge) may be coupled with an output of the conversion circuitry 24 and another one of the battery modules may be coupled with an input of the conversion circuitry 24 to provide electrical energy to the conversion circuitry 24 for use in increasing the state of charge of the selected battery module having the lower state of charge. In one embodiment, the selected battery modules are directly coupled with conversion circuitry 24 (e.g., the selected battery modules may be directly coupled with the input and the output of a DC-to-DC converter of the conversion circuitry 24 via switching circuitry 22 in one embodiment).

In another example, the selected battery module having the different state of charge (e.g., higher state of charge than the nominal state of charge) may be coupled with an input of the conversion circuitry 24 and another one of the battery modules of the storage circuitry 20 may be coupled with an output of the conversion circuitry 24. In this example, electrical energy from the selected battery module is provided to the input of the conversion circuitry 24 to bleed off excess charge and to equalize the state of charge of the battery module coupled with the input of the conversion circuitry 24 with the other battery modules of the storage circuitry 20.

In one embodiment, control circuitry 26 is arranged to process data, control data access and storage, issue commands, and control other desired operations. Control circuitry 26 may comprise circuitry configured to implement desired programming provided by appropriate media in at least one embodiment. For example, the control circuitry 26 may be implemented as one or more of processor(s) and/or other structure configured to execute executable instructions including, for example, software and/or firmware instructions, and/or hardware circuitry. Exemplary embodiments of control circuitry 26 include hardware logic, PGA, FPGA, ASIC, state machines, and/or other structures alone or in combination with a processor. These examples of control circuitry 26 are for illustration and other configurations are possible.

Control circuitry 26 is configured to monitor and control operations of battery system 10 in one embodiment. For example, the control circuitry 26 is configured to monitor the battery modules 10 and to control switching circuitry 22 in response to the monitoring.

In a more specific example, control circuitry 26 is configured to access information regarding states of charge of individual ones of the battery modules during charge and discharge operations. In one embodiment, control circuitry 26 is configured to select and couple one or more selected battery modules of storage circuitry 20 with the conversion circuitry 24 responsive to the monitoring by the control circuitry 26 detecting that at least one of the selected battery modules has a different state of charge than the nominal state of charge of others of the battery modules of the storage circuitry 20 in an attempt to balance or equalize the charge of the at least one selected battery module with the other battery modules of the storage circuitry 20. In one embodiment, the control circuitry 26 is configured to implement balancing operations with respect to an individual one of the battery modules as a result of the state of charge of the individual one of the battery modules deviating from the nominal state of charge by an amount in excess of a threshold. For example, in one arrangement, balancing operations described herein may be implemented with respect to a given battery module if the state of charge of the respective battery module varies from the nominal state of charge by an amount greater than 1% (e.g., corresponding to a difference in voltage of approximately 2 mV of the given battery module with respect to the balanced battery modules in one embodiment).

In illustrative examples, if one of the battery modules is less than the nominal state of charge, then the control circuitry 26 implements operations to increase the state of charge of the one of the battery modules using the conversion circuitry 24 electrical energy from one or more of the others of the battery modules. If one of the battery modules is greater than the nominal state of charge, then the control circuitry 26 implements operations to decrease the state of charge of the one of the battery modules by applying electrical energy from the one of the battery modules to the conversion circuitry 24 and one or more of the others of the battery modules. Additional details are described below with respect to different example embodiments.

Referring to FIG. 3, the depicted example of battery system 10 includes storage circuitry 20 comprising four battery modules 30*a-d* coupled in series between main terminals 14, 16. In the depicted example, battery modules 30*a* is directly coupled with terminal 14 while battery module 30*d* is directly coupled with terminal 16. Other configurations of the storage circuitry 20 are possible including more, less and/or other arrangements of battery modules 30*a-d*.

In the depicted example of FIG. 3, a plurality of module terminals 21 are coupled with positive and negative terminals of individual ones of the rechargeable modules 30*a*-30*d*. Individual ones of the battery modules 30*a*-30*d* have one or more rechargeable cells arranged in series and/or parallel arrangements between the module terminals 21 as discussed above.

Switching circuitry 22 connects module terminals 21 of the battery modules 30*a*-30*d* with respective ones of a plurality of converters 50*a*-50*d* of the conversion circuitry 24. In the illustrated configuration, switching circuitry 22 comprising a plurality of switches 40 to implement the coupling of the module terminals 21 with the converters 50*a*-50*d*. Electrical energy of a battery module 30*a*-30*d* coupled with an input of one of the converters 50*a*-50*d* is used to charge another of the battery modules 30*a*-30*d* coupled with the output of the one of the converters 50*a*-50*d* as described below in one embodiment.

More specifically, in the illustrated configuration of FIG. 3 (where the battery modules 30*a-d* may be referred to as one through four from top to bottom), the second battery module 30*b* is used to charge the first battery module 30*a*, the third battery module 30*c* is used to charge the second battery module 30*b*, the fourth battery module 30*d* is used to charge the third battery module 30*c* and the first battery module 30*a* is used to charge the fourth battery module 30*d*. A plurality of the converters 50*a*-50*d* may be transferring energy at the same moment in time in one example.

In one more specific example of the embodiment of FIG. 3, control circuitry 26 is configured to monitor states of charge of individual ones of the battery modules 30*a-d* (e.g., monitor during charging, discharging, non-conducting, etc.) and to control the switching circuitry 22 in an attempt to balance or equalize the states of charge of the battery modules 30*a-d*. For example, if the first battery module 30*a* is detected to have a state of charge less than the nominal state of charge of the other battery modules 30*b-d*, control circuitry 26 may control the appropriate switches 40 of switching circuitry 22 to couple the module terminals 21 of the second battery module 30*b* with the input of the respective second converter 50*b* to increase the state of charge of the first battery module 30*a*. In this arrangement, battery modules 30*a* and 30*b* are simultaneously coupled with the DC-to-DC converter 50*b* and switching circuitry 22 is configured to isolate battery modules 30*a,c,d* from respective converters 50*a,c,d*. Once battery module 30*a* is balanced with the other battery modules 30*b, c,d*, switching circuitry 22 may disconnect battery module 30*b* from the input of converter 50*b*.

Similarly, if one of the battery modules 30*a-d* is determined to have a state of charge greater than the nominal state of charge of others of the battery modules 30*a-d*, then the one battery module 30*a-d* may be coupled via switching circuitry 22 with its respective converter 50*a-d* to charge the adjacent battery module 30*a-d* in attempt to bleed off charge of the one battery module 30*a-d* to one or more of the other three battery modules 30*a-d*. One or more of the other battery modules 30*a-d* apart from the one battery module 30*a-d* may be isolated from the respective converters 50*a-d* during the bleeding of charge from the one battery module 30*a-d* having the higher state of charge in one embodiment.

In one embodiment, switching circuitry 22 may couple different battery modules 30*a-d* with their respective converters 50*a-d* at the same time to provide balancing of plural groups of battery modules 30*a-d* at the same moment in time. An individual group includes one of the battery modules 30*a-d* coupled with an input of a given converter 50*a-d* and another of the battery modules 30*a-d* coupled with the output of the given converter 50*a-d* creating a path intermediate the two battery modules 30*a-d* at one moment in time. In one illustrative example, battery module 30*d* could charge battery module 30*c* and be referred to as one group while battery module 30*b* charges battery module 30*a* referred to as another group.

The balancing of battery modules 30*a-d* may be continuously implemented until the battery modules 30*a-d* of the battery system 10 are balanced with one another (e.g., the battery modules 30*a-d* have the same state of charge within a threshold such as less than 1%) and thereafter to maintain the balancing in one embodiment. Different battery modules 30*a-d* may be out of balance at different moments in time and need to be balanced. In one embodiment, control circuitry 26 continuously monitors the state of charge of the individual battery modules 30*a-d* and controls switching circuitry 22 as a result of the monitoring to implement balancing operations and equalize the states of charge of the battery modules 30*a-d* to the nominal state of charge. In one embodiment, the balancing operations may be implemented during charge, discharge, and standby (e.g., where storage circuitry 20 is neither charging nor discharging) states. As mentioned above, balancing operations may also be implemented after battery modules 30*a-d* have been balanced and one or more battery module 30*a-d* is subsequently detected to be out of balance.

In one more specific example, one of the battery modules 30*a-d* may discharge faster than others of the battery modules 30*a-d* during discharge, for example, due to capacity and manufacturing tolerances. The one of the battery modules 30*a-d* having the lower state of charge may be charged via the conversion circuitry 24 and using the respective other battery module 30*a-d* configured to charge the one battery module 30*a-d*. Such charging of the one of the battery modules 30*a-d* having the lower state of charge allows the other battery modules 30*a-d* to continue to discharge and the states of charge of the one battery modules 30*a-d* will equalize with the other battery modules 30*a-d* in one embodiment.

The converters 50*a-d* are arranged in a daisy-chained manner in the example configuration of battery system 10 of FIG. 3. For example, charge may be provided from battery module 30*d* to battery module 30*c* to battery module 30*b* to battery module 30*a* in one embodiment. Furthermore, the battery system 10 may also be referred to as a charge loop since charge from battery module 30*a* coupled with the main terminal 14 may be applied via converter 50*a* to battery module 30*d* coupled with main terminal 16. As discussed above according to some example embodiments, more than one of converters 50*a*-50*d* may be simultaneously receiving electrical energy from different battery modules 30*a*-30*d* and applying the electrical energy to different battery modules 30*a*-30*d* to implement balancing operations in one embodiment.

Referring to FIG. 4, another arrangement of battery system 10*a* is shown. Storage circuitry 20 includes three battery modules 30*a-c* coupled in series intermediate main terminals 14, 16 in the illustrated example. Battery system 10*a* also includes switching circuitry 22*a* implemented as a dual-port multiplexer in the illustrated example including a plurality of input switches 42 and a plurality of output switches 44. Conversion circuitry 24*a* includes a single DC-to-DC converter 50 in the illustrated example. The arrangement of switching circuitry 22*a* in FIG. 4 is configured to enable any one of the battery modules 30*a-c* to charge any other of the battery modules 30*a-c* as desired. In one embodiment, the battery modules 30*a-c* coupled with the input and output of converter 50 are isolated from one another as discussed above.

Control circuitry 26 is configured to monitor states of charge of individual battery modules 30*a-c* and to control the switching circuitry 22*a* as a result of the monitoring in one embodiment. The arrangement of FIG. 4 provides the control circuitry 26 with flexibility to select the individual ones of the battery modules 30*a-c* which form a group to be coupled with the converter 50. More specifically, the control circuitry 26 may select one of the battery modules 30*a*-30*c* having a state of charge equal to or above the nominal state of charge to be coupled with the input of the converter 50 and to select one of the battery modules 30*a*-30*c* having a state of charge less than the nominal state of charge to be coupled with the output of the converter 50. Control circuitry 26 may control switches 42*a*-42*c* and 44*a*-44*c* of switching circuitry 22*a* to couple desired battery modules 30*a*-30*c* with the input and output of the converter 50 in one embodiment. Furthermore, control circuitry 26 may control the switching circuitry 22*a* to couple different ones of the battery modules 30*a*-30*c* with the input and output of converter 50 at different moments in time to implement balancing operations in one embodiment.

For example, if battery module 30*a* has a lower state of charge than battery modules 30*b,c*, control circuitry 26 may control one of input switches 42*b,c* to couple one of the battery modules 30*b,c* with the input of the converter 50 and to control the output switches 44*a* to couple the output of the converter 50 with battery module 30*a*. In one embodiment, control circuitry 26 may select the one of the battery modules 30*b,c* having the highest state of charge to charge battery module 30*a* in one embodiment. In the described embodiment, any one of the battery modules 30*a-c* may be selected to charge any other of the battery modules 30*a-c* using converter 50. Accordingly, in the described embodiment, control circuitry 26 has increased flexibility compared to the arrangement of FIG. 3 to select the one of the battery modules 30*a-c* to provide electrical energy to another of the battery modules 30*a-c* without use of pre-defined groups of battery modules where a given battery module is associated with another battery module.

Furthermore, if one of the battery modules 30a-c has a state of charge higher than the others of the battery modules 30a-c (i.e., the nominal state of charge), the one of the battery modules 30a-c may be coupled via respective input switches 42a-c with the input of converter 50 and the output of the converter 50 may be coupled with a different one of the battery modules 30a-c to bleed off charge from the one of the battery modules 30a-c.

In one embodiment, the arrangement of battery system 10a permits any desired one of the battery modules 30a-c to directly charge another desired one of the battery modules 30a-c with increased efficiency compared with an arrangement where a plurality of converters are used to transfer charge between desired battery modules since use of multiple converters may be typically less efficient than use of a single converter.

Referring to FIG. 5, another arrangement of battery system 10b is shown. Other configurations of FIG. 5 are possible. Storage circuitry 20b includes three battery modules 30a-c coupled in series intermediate terminals 14, 16 in the depicted embodiment. Switching circuitry 22b includes a plurality of input multiplexers 46a,b and a plurality of output multiplexers 48a,b. Conversion circuitry 24b includes plural DC-to-DC converters 50a,b coupled with multiplexers 46a,b and 48a,b, respectively. Converters 50a,b may be isolated DC-DC converters where the inputs and outputs of the converters do not share a common reference in one embodiment.

As described above, control circuitry 26 may monitor the states of charge of the individual battery modules 30a-c and control the operations of switching circuitry 22b to form desired groups of battery modules 30a-c for charging as a result of the monitoring. In the illustrated arrangement, the control circuitry 26 may control the input and output multiplexers 46a,b and 48a,b to select any pair of the battery modules 30a-c to form a group for charging as a result of the charging. For example, if battery module 30a has a low state of charge relative to the other battery modules 30b-30c, control circuitry 26 may control either of the multiplexers 46a,b to connect one of battery modules 30b,c with the input of the respective converter 50a,b and to control the respective output multiplexer 48a,b to couple the selected converter 50a,b with battery module 30a.

In one embodiment, control circuitry 26 may control switching circuitry 22b to have plural battery modules 30a-c charge a single one of the battery modules 30a-c. For example, if battery module 30a has a lower state of charge than others of the battery modules 30b,c, input multiplexer 46a could be controlled in one embodiment to couple battery module 30b with an input of converter 50a while input multiplexer 46b could be controlled to couple battery module 30c with an input of converter 50b and output multiplexers 48a,b could couple the outputs of the converters 50a,b with the battery module 30a to rapidly charge battery module 30a at a faster rate compared with only using a single one of the battery modules 30b,c for charging.

Multiplexers 46a, 48a may be considered to form one path while multiplexers 46b, 48b may be considered to form another path in one embodiment. In one embodiment, battery system 10b may control switching circuitry 22b to simultaneously form plural groups of battery modules. For example, if battery system 10b included additional battery modules (not shown) in series between the main terminals 14, 16, the control circuitry 26 could control multiplexers 46a, 48a to charge battery module 30b using battery module 30a and to simultaneously control multiplexers 46b, 48b to charge battery module 30c using the additional battery module. Accordingly, more than one of converters 50a-50b may be simultaneously receiving electrical energy from different battery modules 30a-30c and applying the electrical energy to different battery modules 30a-30c to implement balancing operations in one embodiment.

At least some aspects of the disclosure utilize isolated conversion circuitry (e.g., isolated DC-to-DC converters) which provides increased flexibility with respect to selection of battery modules which may be coupled with the conversion circuitry to provide balancing of the states of charge of the battery modules. According to additional aspects described above, additional energy may be extracted from the rechargeable battery modules used with arrangements of the disclosed balance circuitry compared with other configurations which do not use the balance circuitry. For example, as described above, electrical energy may be provided during discharge from one of the battery modules to another of the battery modules which has a state of charge less than a nominal state of charge in an attempt to avoid the another of the battery modules (and battery) from obtaining a completely discharged state. Accordingly, some arrangements of the disclosure may reduce or avoid situations where the battery is indicated to be discharged (and perhaps taken off-line) when the battery contains additional charge (i.e., in one or more of the battery modules). Some arrangements of the disclosure also provide increased efficiencies by directly coupling desired battery modules to inputs and outputs of conversion circuitry without having to shuttle charge across a plurality of different levels using a plurality of different circuits.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A battery system comprising:
conversion circuitry;
a plurality of main terminals configured to be coupled with a load, a charger and a plurality of rechargeable battery modules which are coupled in series with one another intermediate the main terminals;
switching circuitry configured to couple a first of the battery modules with an input of the conversion circuitry;
the conversion circuitry being configured to receive electrical energy having a first voltage from the first of the battery modules, convert voltage of the received energy from the first voltage to a second voltage, and to output the electrical energy having the second voltage to a second of the battery modules;

wherein the conversion circuitry comprises a first converter coupled with the first and second battery modules and a second converter; and wherein the switching circuitry is configured to selectively couple an input of the second converter with a third of the battery modules and to selectively couple an output of the second converter to the first or second of the battery modules during the coupling of the first of the battery modules with an input of the first converter.

2. The system of claim 1 wherein the conversion circuitry comprises at least one DC-to-DC converter configured to modify the voltage of the electrical energy received from the first of the battery modules.

3. The system of claim 2 wherein the DC-to-DC converter is configured to receive electrical energy having different voltages and to output the electrical energy having a substantially constant voltage.

4. The system of claim 2 wherein the at least one DC-to-DC converter comprises an isolated converter wherein an input and output of the DC-to-DC converter do not share a common reference voltage.

5. The system of claim 1 wherein the first and second of the battery modules are individually directly coupled with the main terminals comprising positive and negative terminals of the battery system.

6. The system of claim 1 wherein the switching circuitry is configured to selectively couple the input of the conversion circuitry with only the first of the battery modules at a first moment in time and to selectively couple the input of the conversion circuitry with only a third of the battery modules at a second moment in time.

7. The system of claim 1 further comprising control circuitry configured to monitor the battery modules and to control the switching circuitry to selectively couple the first of the battery modules with the conversion circuitry as a result of the monitoring.

8. The system of claim 7 wherein the control circuitry is configured to control the switching circuitry to selectively couple the first of the battery modules with the conversion circuitry as a result of the first of the battery modules having a state of charge less than states of charge of others of the battery modules.

9. The system of claim 7 wherein the control circuitry is configured to control the switching circuitry to selectively couple the second of the battery modules with the output of the conversion circuitry.

10. The system of claim 9 wherein the control circuitry is configured to control the switching circuitry to selectively couple the second of the battery modules with the output of the conversion circuitry as a result of the second of the battery modules having a reduced state of charge compared with others of the battery modules.

11. A battery system comprising:
conversion circuitry;
a plurality of main terminals configured to be coupled with a load, a charger and a plurality of rechargeable battery modules which are coupled in series with one another intermediate the main terminals;
switching circuitry configured to couple a first of the battery modules with an input of the conversion circuitry;
the conversion circuitry being configured to receive electrical energy having a first voltage from the first of the battery modules, convert voltage of the received energy from the first voltage to a second voltage, and output the electrical energy having the second voltage to a second of the battery modules; and
wherein the conversion circuitry comprises:
a first converter coupled with the first and second battery modules; and
a second converter, and wherein the switching circuitry is configured to selectively couple an input of the second converter with a third of the battery modules and to selectively couple an output of the second converter with a fourth of the battery modules during the coupling of the first converter to the first and second of the battery modules.

12. The system of claim 1 wherein the switching circuitry and conversion circuitry are configured to provide electrical energy from the first battery module to the second battery module to increase a state of charge of the second battery module.

13. The system of claim 1 wherein the switching circuitry is configured to directly couple the input of the conversion circuitry with the first of the battery modules, and wherein the output of the conversion circuitry is directly coupled with the second of the battery modules.

14. The system of claim 1 wherein module terminals of the first and the second battery modules are not directly coupled with one another.

15. The system of claim 1 further comprising the rechargeable battery modules individually configured to store electrical energy.

16. The system of claim 1 wherein the switching circuitry is configured to electrically couple the first of the battery modules with the conversion circuitry during charging of the battery modules.

17. The system of claim 1 wherein the switching circuitry is configured to electrically couple the first of the battery modules with the conversion circuitry during discharging of the battery modules.

18. The system of claim 1 wherein the switching circuitry is configured to electrically couple the first and second battery modules with the conversion circuitry to balance the states of charge of the first and second battery modules.

19. The system of claim 1 wherein the switching circuitry is configured to couple only the first of the battery modules with the input of the conversion circuitry.

20. A battery system comprising:
a plurality of rechargeable battery modules coupled in series between a plurality of main terminals configured to be coupled with a load and a charger; and
balance circuitry configured to receive electrical energy having a first voltage from a first of the rechargeable battery modules, to modify the voltage of the electrical energy received from the first rechargeable battery module to a second voltage, and to provide the modified electrical energy having the second voltage to a second of the rechargeable battery modules to at least one of decrease the state of charge of the first of the battery modules and increase the state of charge of the second of the battery modules;
wherein the balance circuitry comprises a first converter coupled with the first and second battery modules and a second converter configured to selectively couple an input of the second converter with a third of the battery modules and to selectively couple an output of the second converter to the first or second of the battery modules during the coupling of the first of the battery modules with an input of the first converter.

21. The system of claim 20 wherein the balance circuitry is configured to provide the modified electrical energy to the second of the battery modules to provide increased balancing of the states of charge of the first and second of the rechargeable battery modules compared with the states of charge of the first and second of the rechargeable battery modules prior to the provision of the modified electrical energy to the second of the battery modules.

22. The system of claim 20 wherein the balance circuitry is configured to modify the electrical energy from only the first of the rechargeable battery modules.

23. The system of claim 20 wherein the balance circuitry comprises a DC-to-DC converter configured to modify voltage of the electrical energy received from the first of the battery modules.

24. A rechargeable battery system operational method comprising:
   charging a plurality of rechargeable battery modules of a rechargeable battery which are coupled in series with one another;
   discharging electrical energy from the battery modules to a load;
   selecting a first of the battery modules;
   as a result of the selecting, coupling the first of the battery modules with the input of a first converter and coupling a second of the battery modules with the output of the first converter, the first converter configured to receive electrical energy having a first voltage from the first of the battery modules, modify voltage of the received energy by converting it from the first voltage to a second voltage, and output the electrical energy having the second voltage to the second of the battery modules to at least one of decrease the state of charge of the first of the battery modules and to increase the state of charge of the second of the battery modules; and
   coupling an input of a second converter with a third of the battery modules and coupling an output of the second converter to the first or second of the battery modules during the coupling of the first of the battery modules with the input of the first converter.

25. The method of claim 24 wherein the selecting comprises selecting as a result of the first of the battery modules having a higher state of charge than the state of the charge of the second of the battery modules.

26. The method of claim 24 wherein the selecting comprises selecting in response to a state of charge of the second of the battery modules being less than a nominal state of charge of the battery modules.

27. The method of claim 24 wherein the applying comprises applying electrical energy from only the first battery module of the plurality of battery modules to the second of the battery modules.

28. The method of claim 24 wherein the selecting, the modifying and the applying comprise selecting, modifying and applying as a result of the second of the battery modules having a state of charge less than a nominal state of charge of the battery modules.

29. The method of claim 24 further comprising directly conducting current to individual ones of a plurality of main terminals of the rechargeable battery using respective ones of the first and second of the battery modules.

30. The method of claim 24 wherein the applying comprises applying during the charging.

31. The method of claim 24 wherein the applying comprises applying during the discharging.

32. The method of claim 24 wherein the modifying the voltage comprises modifying using a DC-to-DC converter.

33. The method of claim 24 where the applying comprises applying to balance the state of charge of the second of the battery modules with the others of the battery modules.

34. The method of claim 24 where the applying comprises applying to balance the state of charge of the first of the battery modules with the others of the battery modules.

35. The method of claim 24 further comprising, as a result of the selecting, coupling the first of the battery modules with a DC-to-DC converter and wherein the modifying comprises modifying using the DC-to-DC converter.

36. A rechargeable battery system operational method comprising:
   monitoring states of charge of a plurality of rechargeable battery modules coupled with one another in series;
   detecting a first of the battery modules having a state of charge which is lower than a state of charge of a second of the battery modules;
   coupling the second of the battery modules with the input of a first converter and coupling the first of the battery modules with the output of the first converter, the first converter configured to: receive electrical energy having a first voltage from the second of the battery modules, modify voltage of the received energy by converting it from the first voltage to a second voltage, and output the electrical energy having the second voltage from the second of the battery modules to the first of the battery modules to at least one of increase the state of charge of the first of the battery modules and decrease the state of charge of the second of the battery modules; and
   coupling an input of a second converter with a third of the battery modules and coupling an output of the second converter to the first or second of the battery modules during the coupling of the second of the battery modules with the input of the first converter.

37. The method of claim 36 wherein the modifying and the applying comprise modifying and applying as a result of the first of the battery modules having a state of charge less than a nominal state of charge of the battery modules.

38. The method of claim 36 wherein the modifying and the applying comprise modifying and applying as a result of the second of the battery modules having a state of charge greater than a nominal state of charge of the battery modules.

39. The method of claim 36 wherein the modifying the voltage comprises modifying using a DC-to-DC converter.

40. The method of claim 36 wherein the modifying comprises receiving the electrical energy having a plurality of different voltages and outputting the electrical energy having a substantially constant voltage.

41. The method of claim 36 wherein the detecting comprises detecting the first of the battery modules having a lower state of charge than a nominal state of charge of the battery modules.

42. The method of claim 36 wherein the applying comprises:
   configuring switching circuitry to only couple the second of the battery modules with an input of a DC-to-DC converter; and
   outputting the electrical energy from the DC-to-DC converter to the first of the battery modules.

43. The method of claim 36 wherein the applying comprises applying the electrical energy from only the second of the battery modules.

* * * * *